(No Model.)
N. W. MORTORFF.
SAW SMITHING MACHINE.
No. 450,178. Patented Apr. 14, 1891.
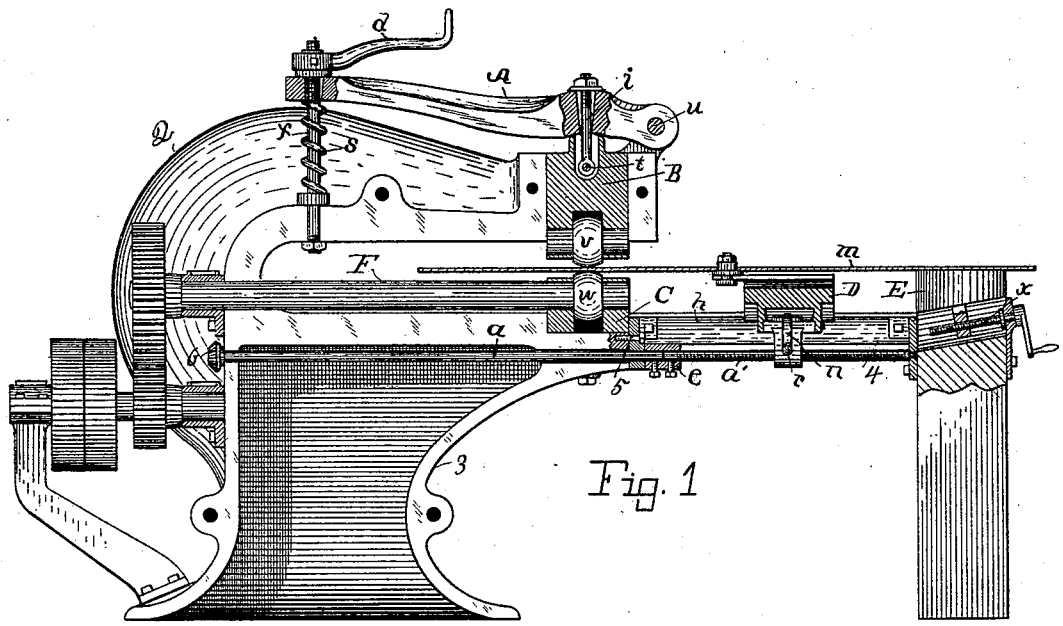
Fig. 1
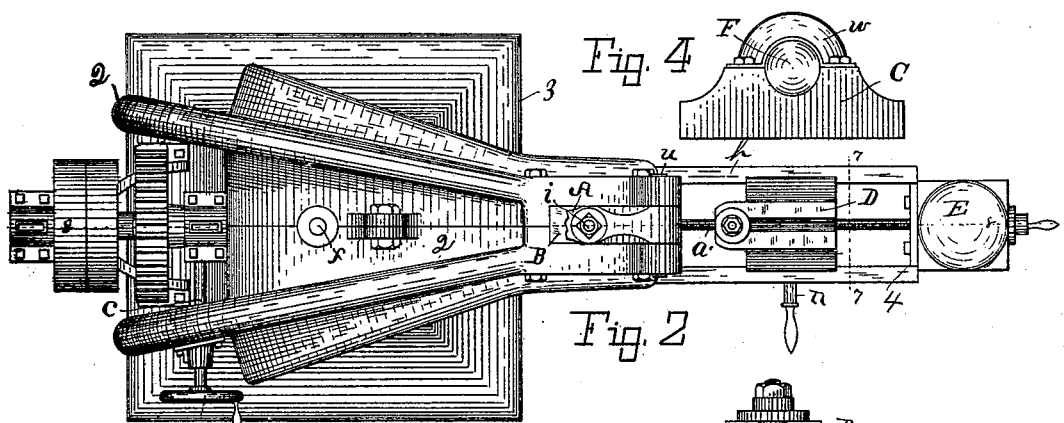
Fig. 4
Fig. 2
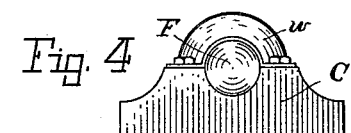
Fig. 5
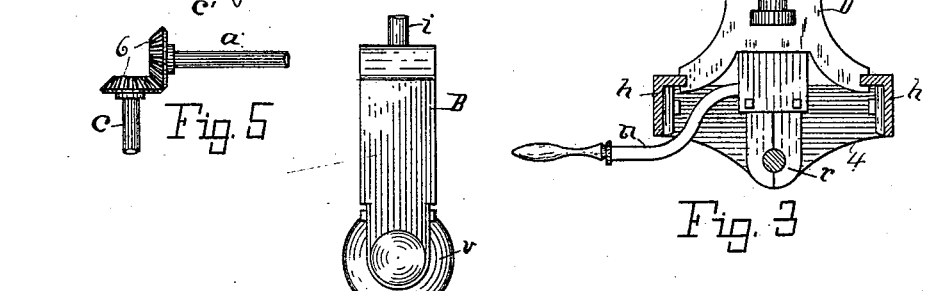
Fig. 6
Fig. 3
Witnesses:
Inventor.
Noah W. Mortorff
By Lucius C. West
Att'y.

UNITED STATES PATENT OFFICE.

NOAH W. MORTORFF, OF JENNINGS, MICHIGAN.

SAW-SMITHING MACHINE.

SPECIFICATION forming part of Letters Patent No. 450,178, dated April 14, 1891.

Application filed October 7, 1890. Serial No. 367,361. (No model.)

*To all whom it may concern:*

Be it known that I, NOAH W. MORTORFF, a citizen of the United States, residing at Jennings, county of Missaukee, State of Michigan, have invented a new and useful Saw-Smithing Machine, of which the following is a specification.

This invention relates to that class of machines which are provided with two rollers, one above another, and between which the saw is rotated, said arrangement of rollers being similar to that found in straight-saw-stretching machines.

The invention more particularly relates to Letters Patent granted to me September 30, 1890, No. 437,221.

The object of the invention consists in certain improved features of construction designed to facilitate the operation and increase the utility of such a machine.

In the drawings forming a part of this specification, Figure 1 is a sectional elevation on line 8 8 in Fig. 2. Fig. 2 is a plan view. Fig. 3 is an enlarged section on line 7 7 in Fig. 2, looking from a point at the right. Figs. 4 and 6 show enlarged lettered details from Fig. 1, looking from a point at the right or left against said parts when detached from the main machine, and Fig. 5 shows enlarged details below described.

The frame here shown consists of the base 3, made in two parts, each part having an integral upwardly-extending and overcurving arm 2, as in Figs. 1 and 2. These parts are bolted together side by side, as in the latter-named figure, and are thus made in two attachable parts to secure greater convenience in handling and in casting. The frame further consists of a detachable extension $h^4$, detachably curved at 5 by bolts. The object of having this part of the frame detachable from the other is that when attached, as here shown, with all its operative parts the machine is adapted for circular-saw smithing, and that the machine may be used for band-saw stretching without the extension referred to. Thus a party may purchase one or both parts for either one or both uses.

The screw-shaft $a\ a'$ will carry the carriage D to and from the rollers $v\ w$, as was shown in my prior patent, except in the present instance it is coupled together at $e$, Fig. 1, so that the right-hand part may be detached or left detached with the frame-extension when not wishing to employ that part. This screw-shaft has bearings in the frame, and is driven by the crank-wheel $c'$, Fig. 2, and shaft $c$, and the beveled gear-connection 6 between said shafts $e$ and $a$, Fig. 5. The circular saw $m$ is centrally and pivotally mounted upon the carriage D, as in my prior patent referred to, so that by turning the crank $c'$ the saw can be moved so as to approach the rollers $v\ w$ or recede therefrom and cause said rollers to traverse over any surface of the saw from its periphery to its center. The roller $w$ is mounted in a bearing-block C of the frame, or, rather, in the base thereof 3, and this roller is driven by the power-shaft F, as in Fig. 1. The idle-roller $v$ is mounted in a vertical adjustable block B, which block has sliding bearings in the free end of the arm 2, so that any desired pressure may be brought to bear upon the saw and that the rollers may be separated when desiring to take the saw out or put it in.

At A is a lever pivoted at $u$ to the front end of the arm 2 and extends back over said arm, as in Fig. 1. The block B is coupled with the lever A, just back of the fulcrum or pivot $u$ by means of the bolt $i$, (or link,) which is pivotally connected with said block at $t$. The hole through the lever A, through which the bolt $i$ passes, is funnel shape, larger at the top, so that when said lever A is swung up or down the bolt $i$ will tilt and give a free action, so as to allow the block B to play vertically without cramping in its bearings. The rear end of the lever A is connected with a bolt $f$, which passes through said lever and is held down by a handled nut $d$ on top of said bolt. Below the lever is a spring S on the bolt $f$. The bolt $f$ is attached to the arm 2. When the nut is loosened, the spring S on the bolt $f$ will force the lever up, thereby raising the block B and releasing the rollers.

Referring to Fig. 3, which shows an enlarged view of the carriage D in Fig. 1, $r$ is a clamp, having a screw-threaded hole through which the screw-threaded shaft $a'$ passes, and a lever $n$ for opening and closing said clamp when desiring to make any considerable movement of the saw at one time, the same as my prior construction referred to, and since this is not new with me in this application no further description is deemed necessary.

At E is an adjustable anvil, Figs. 1 and 2, having an inclined bottom and mounted upon an inclined support. A handled screw $x$ engages with a downward projection of the anvil, by means of which the anvil may be moved down the incline so as to not come in contact with the saw when desiring not to use said anvil. By turning the handled screw the other way the anvil is moved up the incline to bring it in contact with the under surface of the saw when desiring to hammer uneven places in the same.

Having thus described my invention, what I claim as new, and desire to secure by Letters Patent of the United States, is—

1. In a circular-saw-smithing machine, the combination of the frame provided with an overcurving arm, a vertically-sliding block in the end of said arm, a pivoted lever for adjusting said block, an idle-roller having bearings in the base of said block, a roller to which power is applied beneath the other roller, and a movable carriage upon which the saw is revolubly mounted, substantially as set forth.

2. The combination of a frame having the upper and lower roller, one being vertically adjustable and the other adapted to have power applied thereto, and a detachable extension to the frame bearing a movable carriage upon which the saw is to be revolubly mounted, substantially as set forth.

3. In a circular-saw-smithing machine, the combination of the frame having an inclined surface, an anvil having an inclined base mounted thereon, and a handled screw for moving the anvil up and down the incline to adjust the height of the anvil, substantially as set forth.

4. The combination of the frame consisting of two separate bases having upwardly-extending and overcurving integral arms, said parts being bolted together, two rollers between which the saw rotates, having bearings in said frame, and the upper one having bearings in a block which has vertically-adjustable bearings in the free end of the arm, substantially as set forth.

5. The combination of a frame, the rollers, and means to support and adjust them, an attachable extension to said frame, a screw-threaded shaft having bearings in said adjustable frame, a carriage carried by said screw-shaft, a power-shaft having bearings in the main frame end to end with the screw-shaft, and a coupling detachably attaching said shafts together, substantially as set forth.

In testimony of the foregoing I have hereunto subscribed my name in presence of two witnesses.

NOAH W. MORTORFF.

Witnesses:
BELLE C. FREEMAN,
G. N. BURKE.